(12) United States Patent
Gupta et al.

(10) Patent No.: US 11,286,909 B2
(45) Date of Patent: Mar. 29, 2022

(54) PREDICTING WIND TURBINE NOISE

(71) Applicant: VESTAS WIND SYSTEMS A/S, Aarhus N (DK)

(72) Inventors: Mranal Gupta, Tilst (DK); Janne-Pekka Yrjönen, Pudong New District (CN); Jan Johansen, Randers NV (DK); Niels Christian M. Nielsen, Spjald (DK); Edgar Anahua, Rønde (DK); Kaj Dam Madsen, Århus C (DK); Jens Demtröder, Rønde (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 586 days.

(21) Appl. No.: 16/331,100

(22) PCT Filed: Sep. 6, 2017

(86) PCT No.: PCT/DK2017/050282
§ 371 (c)(1),
(2) Date: Mar. 6, 2019

(87) PCT Pub. No.: WO2018/046068
PCT Pub. Date: Mar. 15, 2018

(65) Prior Publication Data
US 2020/0182224 A1  Jun. 11, 2020

(30) Foreign Application Priority Data
Sep. 7, 2016  (DK) .............................. PA201670687

(51) Int. Cl.
*F03D 17/00* (2016.01)
*F03D 7/02* (2006.01)

(52) U.S. Cl.
CPC ........... *F03D 17/00* (2016.05); *F03D 7/0296* (2013.01); *F05B 2260/80* (2013.01);
(Continued)

(58) Field of Classification Search
CPC .... F03D 7/0296; F03D 17/00; F05B 2260/80; F05B 2260/821; F05B 2260/96;
(Continued)

(56) References Cited

U.S. PATENT DOCUMENTS 9,453,499 B2 *   9/2016  Demtroder ............ F03D 7/0276
11,035,343 B2 *  6/2021  Messing ................... F03D 9/25
(Continued)

FOREIGN PATENT DOCUMENTS

CN     104792526 A    7/2015
CN     205370863 U    7/2016
(Continued)

OTHER PUBLICATIONS

Chinese Office Action for Application No. 201780068728.X dated Mar. 19, 2020.
(Continued)

*Primary Examiner* — Pedro J Cuevas
(74) *Attorney, Agent, or Firm* — Patterson + Sheridan, LLP

(57) ABSTRACT

A method 400 of predicting tonal noise produced by a wind turbine is disclosed. The method comprises acquiring 410 a first set of vibration data, the first set of vibration data being from a plurality of vibration sensors positioned at different locations about a wind turbine drivetrain when the wind turbine drivetrain is undergoing testing in a test rig; acquiring 420 a second set of vibration data, the second set of vibration data being from a plurality of vibration sensors positioned at different locations about the same or a similar wind turbine drivetrain when located in a wind turbine; acquiring 430 noise data including tonal noise produced by the wind turbine; identifying 440 a vibration sensor of interest using vibration data of the second set of vibration data and the noise data; determining 450, for the identified
(Continued)

sensor, a first relationship between vibration data of the first set of vibration data and the second set of vibration data; and determining 460, for the identified vibration sensors, a second relationship between the first set of vibration data and tonal noise produced by a wind turbine based on the first relationship.

37 Claims, 6 Drawing Sheets

(52) U.S. Cl.
CPC ..... *F05B 2260/821* (2013.01); *F05B 2260/96* (2013.01); *F05B 2270/32* (2013.01); *F05B 2270/327* (2013.01); *F05B 2270/328* (2013.01); *F05B 2270/329* (2013.01); *F05B 2270/333* (2013.01); *F05B 2270/334* (2013.01); *F05B 2270/335* (2013.01); *Y02E 10/72* (2013.01)

(58) Field of Classification Search
CPC ............ F05B 2270/32; F05B 2270/327; F05B 2270/328; F05B 2270/329; F05B 2270/333; F05B 2270/334; F05B 2270/335; Y02E 10/72
USPC ................................ 702/56; 290/44; 416/36
See application file for complete search history.

(56) References Cited

U.S. PATENT DOCUMENTS

| | | | |
|---|---|---|---|
| 11,125,210 B2* | 9/2021 | Gupta | F03D 7/0224 |
| 2007/0018457 A1* | 1/2007 | Llorente Gonzalez | F03D 7/028 290/44 |
| 2007/0031237 A1* | 2/2007 | Bonnet | F03D 7/048 415/1 |
| 2008/0164091 A1* | 7/2008 | Kerber | F03D 17/00 181/211 |
| 2010/0082276 A1 | 4/2010 | Becker | |
| 2010/0133818 A1* | 6/2010 | Kinzie | F03D 7/0296 290/44 |
| 2010/0135798 A1* | 6/2010 | Eggleston | F03D 7/042 416/36 |
| 2010/0143119 A1* | 6/2010 | Kooijman | F03D 7/0212 416/1 |
| 2011/0135442 A1* | 6/2011 | Kerber | F03D 17/00 415/1 |
| 2014/0193257 A1* | 7/2014 | Ormel | F03D 7/0296 416/31 |
| 2014/0246857 A1* | 9/2014 | Giertz | F03D 3/00 290/44 |
| 2014/0327243 A1* | 11/2014 | Demtroder | F03D 7/042 290/44 |
| 2016/0332892 A1 | 11/2016 | Fujikane et al. | |
| 2019/0203694 A1* | 7/2019 | Gupta | F03D 7/0276 |
| 2020/0318611 A1* | 10/2020 | Gupta | F03D 7/0224 |

FOREIGN PATENT DOCUMENTS

| | | |
|---|---|---|
| EP | 1612458 A2 | 1/2006 |
| EP | 2508750 A1 | 10/2012 |
| WO | 2010037387 A2 | 4/2010 |
| WO | 2018046068 A1 | 3/2018 |

OTHER PUBLICATIONS

Danish Patent and Trademark Office First Technical Examination for Application No. PA 2016 70687 dated Mar. 3, 2017.
Xie Yuan et al. Wind turbine gearbox condition monitoring system based on 1-37 vibration signal, In: IEEE International Conference on Electronic Measurement & Instruments (ICEMI), 2015, vol. 1 p. 159-163, see Abstract, Section iII, "Condition monitering of WT gearboxes" and Section IV, "Test rig".
PCT International Search Report, for Application No. PCT/DK2017/050282 dated Mar. 3, 2017.
Ryi Jaeha et al: "A full-scale prediction method for wind turbine rotor noise by using wind tunnel test data", Renewable Energy, Pergamon Press, Oxford, GB, vol. 65, Oct. 30, 2013 (Oct. 30, 2013), pp. 257-264, XP028818762, ISSN: 0960-1481, DOI: 10.1016/J. RENENE.2013.09.032 abstract.
PCT Written Opinion of the International Searching Authority for Application No. PCT/DK2017/050282 dated Mar. 3, 2017.

* cited by examiner

PREDICTING WIND TURBINE NOISE

TECHNICAL FIELD

The present invention relates to predicting noise produced by wind turbines, and in particular to predicting tonal noise originating from wind turbine drivetrains.

BACKGROUND

Noise emission from wind turbines is a well-known problem and has been the subject of extensive work. The procedure for measuring wind turbine acoustic noise is described in the third edition of international standard IEC 61400-11.

The noise emission from a wind turbine includes both mechanical noise and aerodynamic noise. Mechanical noise includes noise driven by components within the nacelle, such as the wind turbine drivetrain. Such noise can be radiated to the surroundings directly from the surface of vibrating components (so-called airborne noise) or can be radiated to the surroundings by the wind turbine tower or blades when vibrations of components are conducted through the structure of the wind turbine (so-called structure borne noise (SBN)). Aerodynamic noise comes from the wind turbine blades and includes, for example, noise due to vortex-shedding.

The spectrum of noise produced by a wind turbine includes both broadband noise and noise at distinct frequencies. Noise at distinct frequencies, known as tonal noise, is often perceived as more annoying to wind turbine neighbours and is more likely to be the subject of noise complaints. Unfortunately, it is difficult to predict when a wind turbine will produce tonal noise and when tonal noise will be audible to wind turbine neighbours as this can depend on a wide variety of factors.

The wind turbine drivetrain, which typically includes a gearbox and/or a generator, is known to be a significant driver of tonal noise produced by a wind turbine. However, due to the aforementioned problems, it is difficult to predict when and how much tonal noise will be produced, and when tonal noise will be audible, when a drivetrain is deployed in a wind turbine.

An object of the present invention is therefore to provide a method of predicting tonal noise produced by a wind turbine, and in particular for predicting tonal noise originating from a wind turbine drivetrain.

SUMMARY OF THE INVENTION

The invention is defined in the independent claims to which reference should now be made. Preferred features are detailed in the dependent claims.

According to a first aspect of the present invention, there is provided a method of predicting tonal noise produced by a wind turbine. The method comprises acquiring a first set of vibration data, the first set of vibration data being from a plurality of vibration sensors positioned at different locations about a wind turbine drivetrain when the wind turbine drivetrain is undergoing testing in a test rig; acquiring a second set of vibration data, the second set of vibration data being from a plurality of vibration sensors positioned at different locations about the same or a similar wind turbine drivetrain when located in a wind turbine; acquiring noise data including tonal noise produced by the wind turbine; identifying a vibration sensor of interest using vibration data of the second set of vibration data and the noise data; determining, for the identified sensor, a first relationship between vibration data of the first set of vibration data and the second set of vibration data; and determining, for the identified vibration sensor, a second relationship between the first set of vibration data and tonal noise produced by a wind turbine based on the first relationship.

The step of identifying a vibration sensor of interest using vibration data of the second set of vibration data and the noise data may comprise identifying a vibration sensor for which vibration data of the second set of vibration data correlates with tonal noise within the noise data. However, any method of determining a vibration sensor with an output that relates to noise data in a predictable way may be employed. This may generally be the case when identifying vibration sensors when described herein.

In some embodiments, the method further comprises determining a predetermined criteria based on the second relationship and a predetermined noise level. The predetermined criteria may be a criteria fulfilled by the sensor data that indicates when tonal noise is occurring beyond a particular level. The predetermined criteria may, for example, be a threshold level, such as a vibration level, based on the second relationship and a predetermined noise level. However, the predetermined criteria, e.g. threshold level, need not be a specific vibration level for each sensor. Alternatively, a tonal noise level may be calculated from vibration levels from identified sensors, and it may be determined if this meets the predetermined criteria, such as passing the threshold. The criteria may be a tonal noise level. The method may also comprise acquiring a third set of vibration data, the third set of vibration data being data from a plurality of vibration sensors positioned at different locations about a second wind turbine drivetrain when the second wind turbine drivetrain is undergoing testing in a test rig. The method may then further comprise determining whether vibration data of the third set of vibration data meets a predetermined criteria, such as exceeding a threshold vibration level, predicting a tonal noise level produced by a wind turbine using the third set of vibration data and the second relationship, and/or predicting one or more wind turbine operating parameters for which a wind turbine will produce tonal noise using the third set of vibration data and the second relationship.

Determining a relationship between drivetrain vibration data acquired during testing in a test rig and tonal noise produced by a wind turbine allows predictions to be made as to whether, to what extent, and under what conditions, another drivetrain undergoing testing in the future will produce tonal noise when it is deployed in a wind turbine, without having to actually deploy the drivetrain being tested in a wind turbine. For example, the relationship can be determined using a prototype drivetrain, and then predictions can be made from test results on series drivetrains. If it is predicted that a wind turbine incorporating the drivetrain being tested in the test rig will produce tonal noise when operated at particular operating parameters, or within a particular region of operating parameters, such operating parameters or regions can be avoided once the drivetrain is deployed without having to perform extensive testing in the field or waiting for wind turbine neighbours to complain.

Further, the ability to predict tonal noise based on test rig measurements can be used to implement improved factory acceptance tests and improve decision making in drivetrain deployment. For example, different countries stipulate different acceptable levels of tonal noise. Based on the predicted level of tonal noise that will be produced by a wind turbine incorporating the drivetrain in question, and the levels stipulated by different countries, a decision can be made as to where to deploy the drivetrain. As another example, if a drivetrain is required for a wind power plant with particular requirements, either because to the position of wind turbine neighbours or because of particular wind conditions, a drivetrain that is predicted to meet those requirements can be deployed. As such, drivetrains can be sorted or selected according to criteria for specific projects or markets based on the test results, based on the calculated tonality of the component, for example using a criterion defined as critical to tonality (CTT).

In some embodiments, the method further comprises acquiring a set of operating parameter data representing operating parameters of the test rig when the wind turbine drivetrain is undergoing testing in the test rig. The operating parameter data representing operating parameters of the test rig may comprise one or more of RPM, torque and power.

Acquiring operating parameter data allows the vibration of the drivetrain in the test rig to be more completely characterized. For example, vibration data and operating parameter data can be combined so that the vibration of the drivetrain can be studied in particular operational areas which may be of interest, and the relationship between vibration data of the first and second sets of vibration data can be determined for particular operational areas.

The first set of vibration data may include vibration data captured during one or more constant torque run-ups. Constant torque run-ups provide vibration data for a wide range of drivetrain operating parameters, and therefore allow the vibration of the drivetrain to be characterized for a wide range of drivetrain operating parameters.

The method may further comprise acquiring noise data from one or more microphones configured to capture noise produced by the test rig when the drivetrain is undergoing testing in the test rig. Such noise measurements may be useful where airborne tonality, that is tonal noise radiated directly from vibrating components such as the drivetrain, as opposed to tonal noise driven by the vibration of components such as the drivetrain but being radiated to the surrounding by the blades are tower, has been observed or is expected to occur.

The method may further comprise acquiring a set of operating parameter data representing operating parameters of the wind turbine. The operating parameter data representing operating parameters of the wind turbine comprise one or more of RPM, torque, power, blade pitch angle, yaw angle, wind speed and wind direction.

Acquiring operating parameter data allows the vibration of the drivetrain in the wind turbine and noise produced by the wind turbine to be more completely characterized. For example, the vibration and/or noise data can be combined with the operating parameter data so that vibration of the drivetrain and/or the noise produced can be studied in particular operational areas which may be of interest, and vibration sensors may be identified based on a correlation between vibration data and noise data in particular operational areas or regions of interest.

The noise data including tonal noise produced by the wind turbine and the second set of vibration data comprise data captured during testing of the wind turbine. The testing may include one or more constant torque run-ups of the wind turbine. Additionally or alternatively, the noise data including tonal noise produced by the wind turbine and the second set of vibration data may comprise data captured during normal operation of the wind turbine.

Capturing data during testing of the wind turbine provides vibration and noise data for a wide range of operating parameters and therefore allow the vibration of the drivetrain and the noise produced by the wind turbine to be characterized for a wide range of operating parameters. Capturing vibration and noise data during normal operation of the wind turbine allows critical areas of normal wind turbine operation, where tonal noise is produced, to be identified, and may improve the accuracy of the determined relationship between vibration of the drivetrain in the test rig and tonal noise production by the wind turbine. In some embodiments, vibration and noise data is captured during both normal operation of the turbine and during testing to provide the advantages of both.

The noise data may comprise data captured by one or more microphones positioned about the nacelle of the wind turbine. Such data is useful where airborne tonality, that is tonal noise radiated directly from surfaces of vibrating components such as the drivetrain, as opposed to tonal noise driven by the vibration of components such as the drivetrain but being radiated to the surrounding by the blades are tower, may occur. Having such data may allow the second relationship to predict airborne tonality from test rig vibration data.

Where the noise data comprises data captured by one or more microphones positioned about the nacelle of the wind turbine, and where noise data has been acquired from one or more microphones configured to capture noise produced by the test rig when the drivetrain is undergoing testing in the test rig, the method may further comprise determining a relationship between such noise data. This may allow improved prediction of airborne tonality from test rig data.

At least one of the plurality of vibration sensors associated with the second set of vibration data may be associated with a Condition Monitoring System (CMS) associated with the wind turbine. Using pre-existing CMS vibration sensors reduces the need to install new vibration sensors to implement the present invention.

The method may further comprise identifying a region of interest in the noise data, the region of interest being a candidate for containing tonal noise produced by the wind turbine. Identifying the vibration sensor may comprise identifying a vibration sensor based on the noise data in the region of interest. In particular, identifying a vibration sensor for which vibration data of the second set of vibration data correlates with the noise data in the region of interest. Identifying the region of interest may comprise determining a variation of detected noise levels in the noise data indicative of tonal noise.

Vibration level data does not generally correlate well with noise data representing audible noise away from the turbine. This is partly because the relationship between vibration and audible noise is very complex. As well as multiple primary sources of vibration, there are secondary sources of vibration that are being driven by primary sources, and tertiary sources being driven by secondary sources and so on. Non-primary sources can, in some cases, be more significant, especially if the driving frequency corresponds to a resonant frequency of the source that is being driven. Additionally, the extent to which vibrations from different sources and different frequencies will be radiated to the surroundings as noise varies significantly, as can the direction of propagation. Further still, how the sound is radiated can vary significantly depending on operating parameters of the wind turbine such as the RPM, wind speed and wind direction.

However, vibration levels may correlate well with audible noise levels in relatively narrow regions of the noise data, especially where the noise includes distinct frequencies that stand out from the broadband noise. Therefore, by identifying a region of interest in the noise data that may correspond to tonal noise, and correlating noise and vibration specifically in this region of interest, it is possible to use vibration level in a particular vibration sensor channel as a predictor for tonal noise.

The method may further comprise determining a set of wind turbine operating parameters corresponding to the region of interest. Determining, for the identified vibration sensor, the first relationship between vibration data of the first set of vibration data and vibration data of the second set of vibration data may comprise determining the first relationship for the wind turbine operating parameters corresponding to the region of interest.

As explained previously, the correlation between vibration and noise produced by the wind turbine may be best in the relatively narrow regions of interest of the data. Determining the relationship between the vibration of the drivetrain in the test rig and the vibration of the drivetrain in the wind turbine, which is in turn used to determine the relationship between vibration of the drivetrain in the test rig and tonal noise produced by the wind turbine, for a relatively narrow range of operating parameters may result in better tonal noise predictions.

Determining, for the identified vibration sensor, a second relationship between the first set of vibration data and tonal noise produced by a wind turbine based on the first relationship may further comprise determining a relationship between vibration data of the second set of vibration data and the noise data. In some embodiments, the noise data comprises noise data captured during normal operation of the wind turbine and noise data captured during testing of the wind turbine, and the method may further comprise determining a relationship between noise data captured during normal operation and noise data captured during testing.

The method may further comprise identifying one or more additional vibration sensors of interest using vibration data of the second set of vibration data and the noise data. In particular, the one or more additional vibration sensors may be sensors for which vibration data of the second set of vibration data correlates with tonal noise within the noise data. The vibration data of the identified vibration sensors may correlate with the noise data for different wind turbine operating parameters. The first relationship may include a weighted sum of vibration data of the identified vibration sensor and the vibration data of the one or more additional identified vibration sensors. The second relationship may include a weighted sum of vibration data of the identified vibration sensor and vibration data of the one or more additional identified vibration sensors. The weightings used in the weighted sum may be based on the strength of the correlations between the second set of vibration data and tonal noise within the noise data.

Identifying multiple vibration sensors may be advantageous where vibrations at multiple locations about the drivetrain contribute to tonal noise at about the same frequency, where tonal noise is observed at multiple different frequencies for a single set of wind turbine operating parameters, or where tonal noise is observed at different wind turbine operating parameters, as it may allow for a more accurate and complete characterization of the tonal noise produced by the wind turbine. Taking a weighted sum may better describe the shapes of the modes responsible for tonal noise. In particular, the strengths of the correlations give an indication of the modes and modes shapes that are most dominant and responsible for tonality, and may also provide an indication of the dominant transfer paths. Using weightings based on the strengths of the correlations therefore allows this information to be incorporated into the results, and the operation of the wind turbine to be modified to take this into account.

Where one or more additional vibration sensors have been identified, the method may further comprise determining, for each of the respective one or more additional vibration sensors, a respective first relationship between vibration data of the first set of vibration data and vibration data of the second set of vibration data; and determining, for each of the respective one or more additional vibration sensors, a respective second relationship between the first set of vibration data and tonal noise produced by a wind turbine based on the respective first relationship.

The method may further comprise determining, for each of the one or more additional vibration sensors, a predetermined criteria, such as a threshold vibration level, based on the respective second relationship and a predetermined noise level.

The location of at least one of the plurality of vibration sensors associated with the first set of vibration data may correspond to the location of at least one of the plurality of vibration sensors associated with the second set of vibration data. Positioning the vibration sensors at corresponding location simplifies determining relationships between vibration data of the first set of vibration data and vibration data of the second set of vibration data.

A computer system comprising one or more computers configured to the implement the method of predicting tonal noise produced by a wind turbine is also provided.

A computer program which when executed on a computing device causes it to carry out the method of predicting tonal noise produced by a wind turbine is also provided.

BRIEF DESCRIPTION OF THE DRAWINGS

Examples of the invention will now be described in more detail with reference to the accompanying drawing in which.

DETAILED DESCRIPTION OF PREFERRED EMBODIMENTS

Figure 1A:
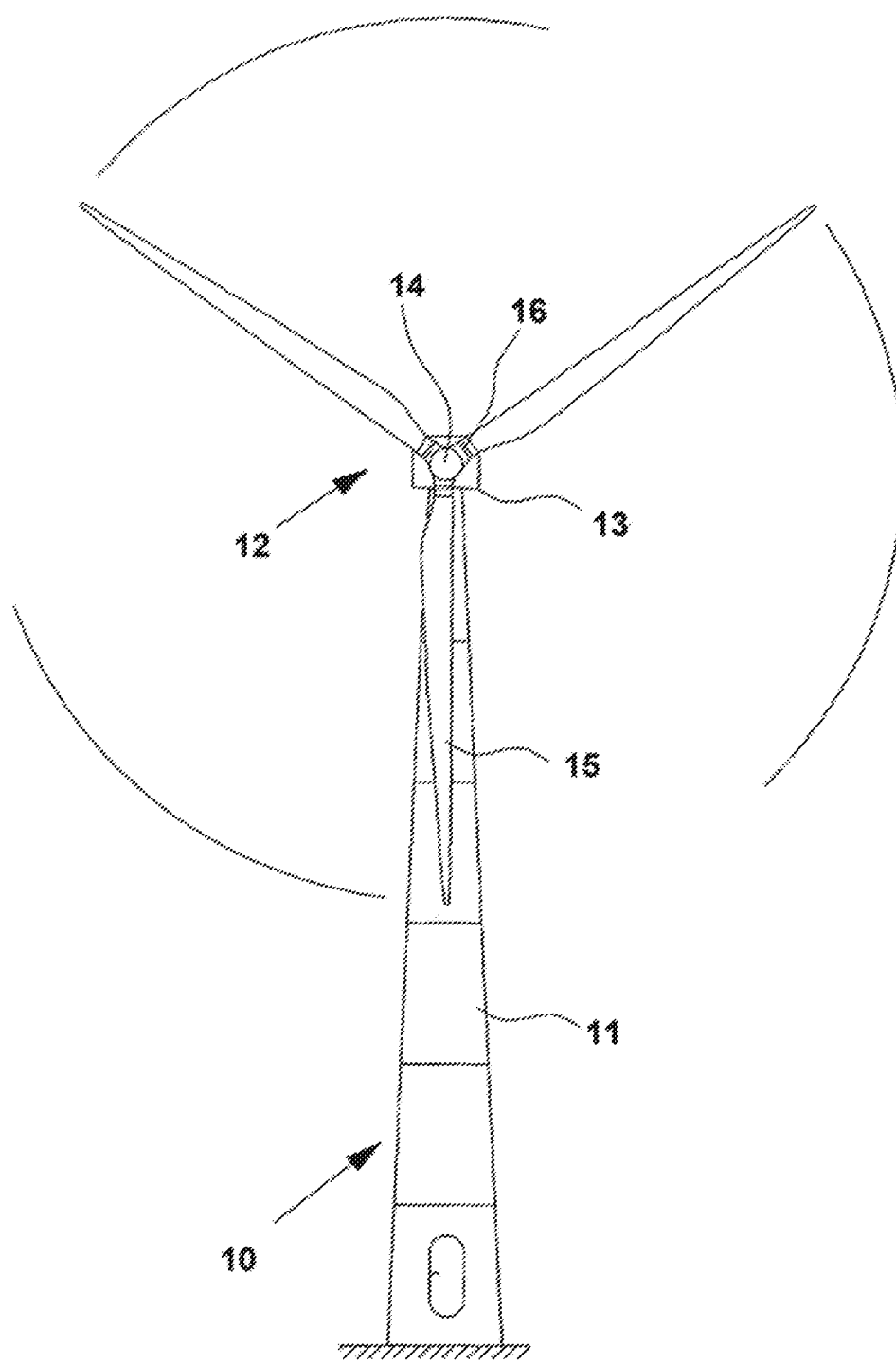
FIG. 1A illustrates a large modern wind turbine.

FIG. 1A illustrates a large modern wind turbine 10 as known in the art, comprising a tower 11 and a wind turbine nacelle 13 positioned on top of the tower. Wind turbine blades 15 of a turbine rotor 12 are mounted on a common hub 14 which is connected to the nacelle 13 through the low speed shaft extending out of the nacelle front. The wind turbine blades 15 of the turbine rotor 12 are connected to the hub 14 through pitch bearings 16, enabling the blades to be rotated around their longitudinal axis. The pitch angle of the blades 15 can then be controlled by linear actuators, stepper motors or other means for rotating the blades. The illustrated wind turbine 10 has three turbine blades 15, but it will be appreciated that the wind turbine could have another number of blades such as one, two, four, five or more.

Figure 1B:
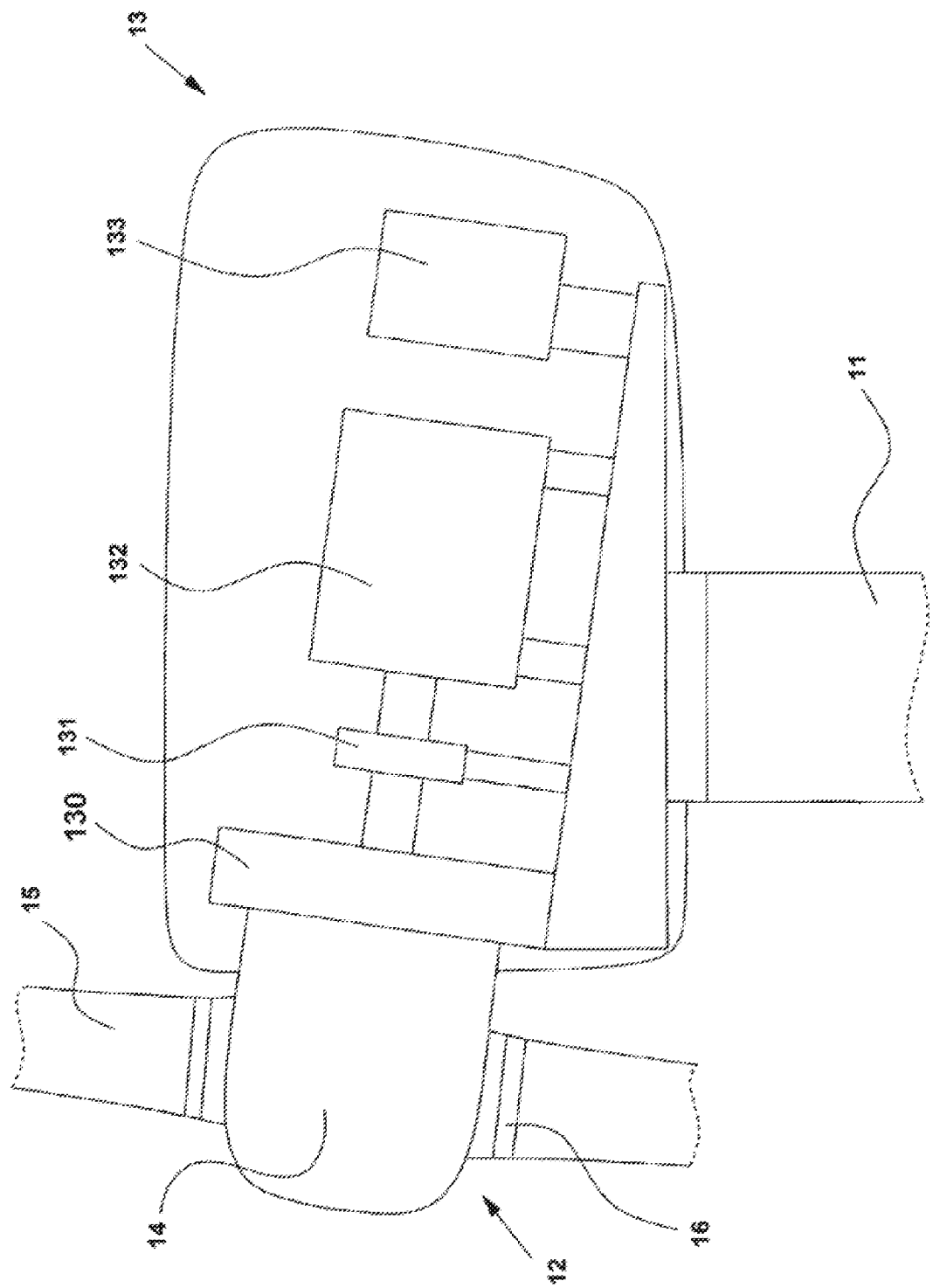
FIG. 1B illustrates a simplified cross section of a wind turbine nacelle, as seen from the side.

FIG. 1B illustrates a simplified cross section of an example nacelle 13 of a wind turbine 10, as seen from the side. The nacelle 13 exists in a multitude of variations and configurations but in most cases comprises one or more of following components: a gearbox 130, a coupling (not shown), some sort of braking system 131 and a generator 132. A nacelle can also include a converter 133 (also called an inverter) and additional peripheral equipment such as further power handling equipment, control cabinets, hydraulic systems, cooling systems and more.

It will be understood that the term "drivetrain" refers to one or more of the components within the nacelle 13 that are coupled to the turbine rotor 12. The drivetrain typically includes a gearbox 130 and/or a generator 132, and may additionally include other components such as a braking system 131.

Figure 2:
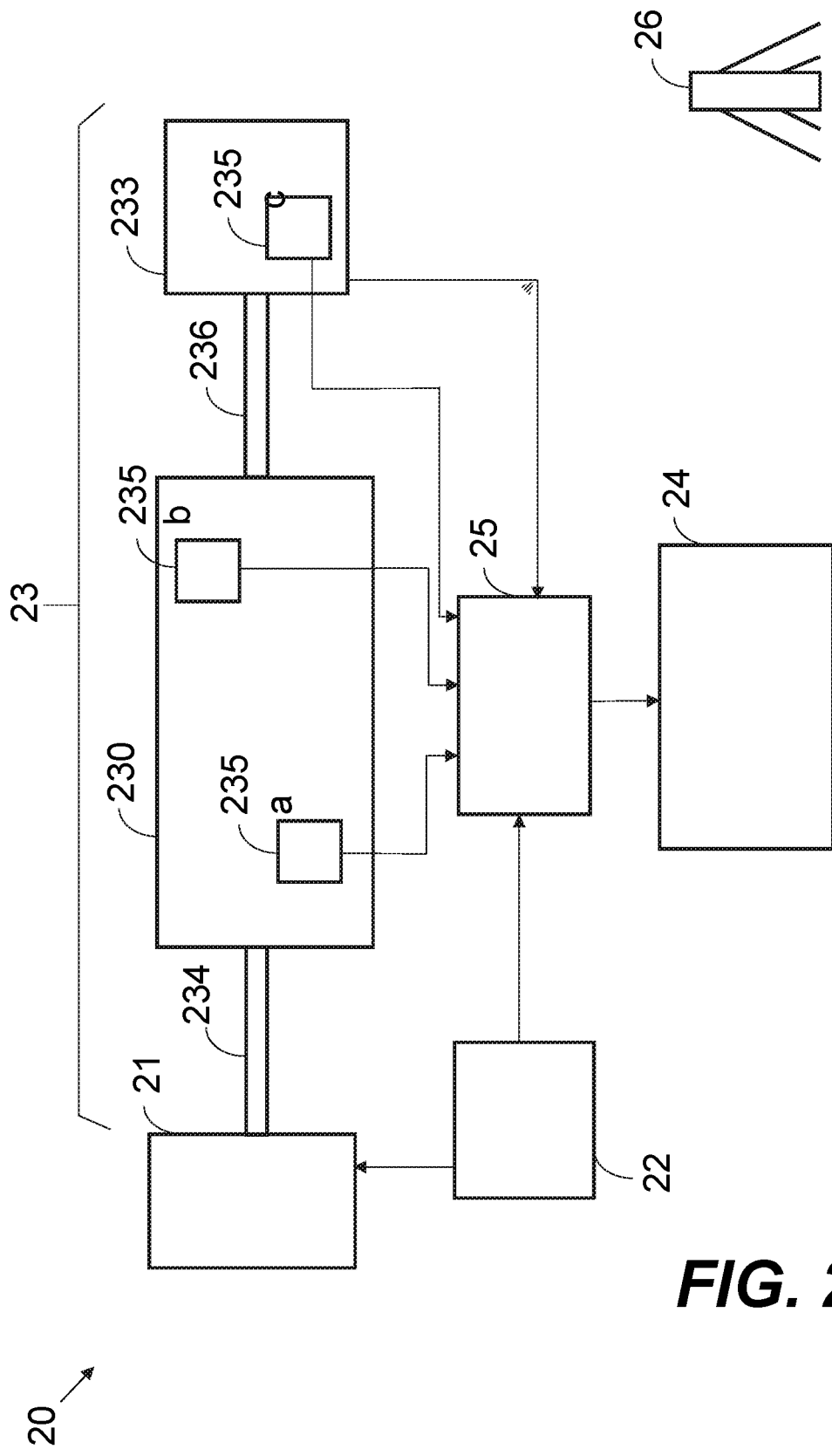
FIG. 2 is a schematic diagram of a test rig for a wind turbine drivetrain.

FIG. 2 is a schematic diagram illustrating a test rig 20 for testing a wind turbine drivetrain 23. The drivetrain 23 shown in FIG. 2 includes a gearbox 230 coupled to generator 233 via a high-speed shaft 236, but it will be appreciated that the drivetrain may include only a gearbox 230, only a generator 233, or additional components not shown in FIG. 2. The test rig 20 can be used to perform various tests on a wind turbine drivetrain 23 in order to determine the characteristics of the drivetrain 23, for diagnostics, for quality assurance, and/or for end of line factory acceptance tests. Test rigs such as test rig 20 may be located in dedicated testing facilities, factories or anywhere else.

Wind turbine drivetrain test rig 20 includes a motor 21 for delivering torque to the gearbox 230 via a low speed shaft 234. The motor 21 receives power via a motor controller 22 such that the torque delivered to the gearbox 230 can be varied. It will be appreciated that the motor 21 emulates the turbine rotor of a wind turbine, such as turbine rotor 12 of wind turbine 10 described above with reference to FIGS. 1A and 1B. The output of the gearbox 230 is coupled to the generator 233 via the high-speed shaft 236.

It should be appreciated that the test rig 20 shown in FIG. 2 is simplified for illustration, and also that other test rig configurations are known and suitable for implementing the present invention. For example, although test rig 20 includes a generator 233 coupled to the gearbox 230, this need not be the case, and the test rig 20 can include additional or alternative elements not shown in FIG. 2. It is desirable for the test rig to emulate the characteristics of an actual wind turbine, so the test rig 20 may include other elements of a wind turbine nacelle, such as the nacelle 13 described above with reference to FIG. 1B.

Other examples of test rigs are possible. Gearboxes or drivetrains may be tested on "back-to-back" test-rigs where two gearboxes are arranged with the low speed side facing each other. The test rigs could be mechanical or electrical. In an electrical test-rig the high speed shafts of both gearboxes are connected via coupling and/or shafts to generators at both sides of the test rig. The generators can be controlled such that they are either in motor or generator mode, allowing to switch the tested gearbox (connected to the motor) during the testing without mechanically disconnecting any components. In mechanical back-to-back arrangements, both gearboxes may be mechanically connected from low speed side as in electrical arrangements. In mechanical back-to-back test rigs though, the high speed pinions of the gearboxes may be connected to each other via a series of speed increase/decrease gearboxes (different to the tested gearboxes) and shafts forming a closed mechanical loop.

The drive motor connected to the close loop then feeds the arrangement with mechanical losses caused by the whole test arrangement. In this way two gearboxes are tested one after the other just by switching the direction of current.

According to embodiments of the present invention, vibration sensors 235a, 235b, 235c are positioned at different locations about the drivetrain 23 to capture vibration data representative of the vibration levels at the respective positions during testing. The vibration sensors 235a, 235b, 235c communicate vibration data to one or more computers 24, for example via an interface 25, as is known in the art.

The vibration sensors 235a, 235b, 235c are accelerometers, strain gauges or other sensors known in the art that are suitable for measuring vibration levels. It should be appreciated that although FIG. 2 shows three vibration sensors 235a, 235b, 235c, this is merely for ease of illustration, and any number of vibration sensors can be used. There will typically be many more than three vibration sensors, perhaps around ninety, positioned at different locations about the drivetrain 23.

The computer 24 may also receive data representing operating parameters of the drivetrain 23, such as one or more of the torque delivered to gearbox 230 by the motor 21 via low-speed shaft 234, the RPM of the low-speed shaft 234, the RPM of the high-speed shaft 236 and the power developed by the generator 233. Such data can be captured by suitable sensors, as is known in the art. The operating parameter data may be time-synchronized with the vibration data so that data from the various sensor channels can be readily compared and combined.

Optionally, one or more microphones 26 are positioned at different locations surrounding the test rig 20 to capture noise data and communicate it to the one or more computers 24 for analysis. Obtaining such noise data can be advantageous if airborne tonality has been observed, or is suspected. The noise data may be time-synchronized with the vibration data and operating parameter data so that data from the various sensor channels can be readily compared and combined.

The computer 24 therefore acquires vibration data and optionally acquires operating parameter data and/or noise data, during testing of the drivetrain 23 in the test rig 20. By testing the drivetrain 23 over a wide range of operating parameters, and acquiring extensive vibration data from the vibration sensors 235a, 235b, 235c, the vibration levels at the different locations about the drivetrain gearbox 23 are characterized in terms of the various operating parameters. Likewise, if noise data is captured, the noise at different locations surrounding the test rig 20 can be characterized as a function of the various operating parameters and the vibration levels at the different locations about the drivetrain 23.

Testing of the drivetrain 23 in the test rig 20 involves running the drivetrain over a range of operating parameters. Any suitable testing regime known in the art can be used. In one embodiment of the present invention, 'constant torque run-ups' are used.

In a constant torque run-up, the motor 210 is used to deliver a constant torque to the gearbox 230 via the low speed shaft 234, and other operating parameters of the gearbox such as RPM and power are varied. Constant torque-run ups are repeated at various different torque values in order to obtain data for a wide range of operating parameters. For example, constant torque run-ups may be performed at torques of 25%, 33%, 50%, 67%, 75% and 100% of a maximum or nominal torque value.

The testing of the wind turbine drivetrain 23 may be performed over a wide range of operating parameters. Additionally or alternatively, the testing may focus on one or more particular operational areas of the wind turbine drivetrain 23. For example, if it has previously been determined that tonal noise occurs or is likely to occur in a particular operational area (so-called 'critical areas'), or that high levels of drivetrain vibration occur or are likely to occur in a particular operational area, it may be desirable to obtain particularly detailed test data in such operational areas.

Alternatively or additionally, the testing is also performed using operating parameters corresponding to known operational curves. For example, torque and RPM may be varied simultaneously according to the operational curves to mimic wind turbine operation.

Figure 3:
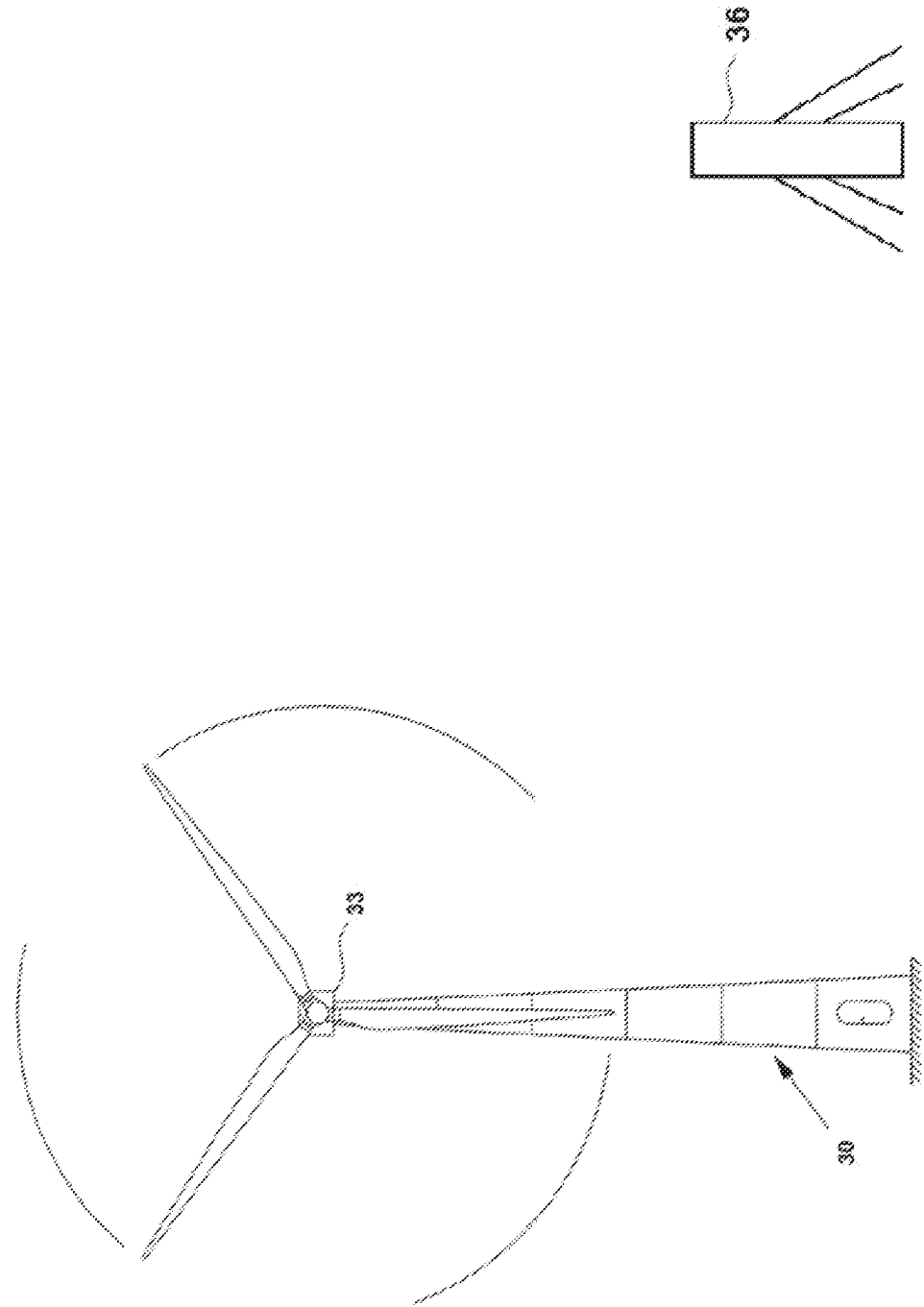
FIG. 3 illustrates a large modern wind turbine and microphone for capturing noise produced by the wind turbine.

FIG. 3 illustrates a wind turbine 30 and a microphone 36 located in the vicinity of the wind turbine 30. Wind turbine 30 can be any wind turbine model known in the art, such as wind turbine 10 described above with reference to FIGS. 1A and 1B. Wind turbine 30 may be part of a larger wind power plant that includes a number of wind turbines, may be a standalone wind turbine, or may be a wind turbine dedicated to testing.

Microphone 36, which may be an IEC microphone operating in accordance with the procedure described in the third edition of IEC 61400-11, is configured to capture noise data, including data representative of the noise produced by wind turbine 30, and communicate it for analysis. For example, it may be communicated to one or more computers (not shown) associated with wind turbine 30. While FIG. 3 only shows one microphone 36, there may be additional microphones at other positions, such as within, or within the vicinity of, the nacelle 33, in which case the noise data for the additional microphones can also be communicated for analysis. Microphones on or within the nacelle 33 are useful for capturing airborne noise, that is to say noise radiated directly from components such as the drivetrain, rather than structure borne noise that results from component vibrations that are conducted through the structure of the turbine 30 and radiated to the surroundings by the tower and blades.

Wind turbine 30 includes a nacelle 33 that houses a drivetrain (note that the drivetrain is not actually visible in FIG. 3). According to embodiments of the present invention, vibration sensors (not shown) are positioned at different locations about the drivetrain of the wind turbine 30 to capture vibration data representative of the vibration levels at the respective positions of the drivetrain. Vibration data from a plurality of vibration sensors are communicated from the vibration sensors for analysis. For example, the vibration data may be communicated to the one or more computers to which the noise data is communicated The vibration sensors are accelerometers, strain gauges or other sensors known in the art that are suitable for measuring vibration levels. In some embodiments, at least some of the vibration sensors are vibration sensors associated with a Condition Monitoring System (CMS) that is associated with one or more wind turbines including wind turbine 30. Some known wind turbines are associated with a CMS that monitors vibration levels of components of the wind turbine to predict possible component failure. Where this is the case, such vibration sensors may be used to provide vibration data for the present invention. Additionally or alternatively, one or more vibration sensors that are not associated with a CMS may be used to acquire vibration data.

Any number of vibration sensors can be used, perhaps around ninety, positioned at different locations about the drivetrain. At least some the vibration sensors may be positioned at locations corresponding to the locations of the vibration sensors, such as sensors 235a, 235b and 235c, positioned at the various locations about drivetrain 23 in test rig 20, described above with reference to FIG. 2.

Operating parameters of the wind turbine 30 may also be measured by appropriate sensors, as is known in the art. For example, one or more of the RPM, power output, torque and/or blade pitch angle of a wind turbine 30 may be recorded over time. The wind speed and/or wind direction at a wind turbine may also be recorded over time. Wind turbine operating parameter data representative of any of these parameters may be communicated for analysis. For example, the wind turbine operating parameter data may be communicated to the computer(s) to which the vibration data and noise data is communicated.

Therefore, vibration data representative of the vibration levels at the respective positions of the drivetrain, noise data representative of the noise produced by wind turbine 30, and, optionally, operating parameter data representing operating parameters of the wind turbine are communicated for analysis. The noise data, vibration data and operating parameter data may be time synchronized so that data from the various sensor channels can be readily compared and combined.

Such data can be acquired under normal operation conditions and/or during testing of the wind turbine 30. Preferably, data is obtained for both normal operating conditions and during testing.

Wind turbines are usually operated using predetermined sets of operating parameters, or within predetermined operational envelopes, for which operation is safe and efficient given the wind conditions. By "normal operating conditions", it is meant that the wind turbine 30 is being allowed to operate under wind power using such a predetermined set of operating parameters or within such a predetermined operational envelope, given the wind conditions.

By testing of the wind turbine 30, it is meant that the wind turbine 30 is not operating under normal operating conditions. This may be operation where the wind turbine 30 is allowed to run under wind power, but using operating parameters that are not typical of normal operation, in order to obtain data over a wider range of operating parameters. Alternatively, testing may involve allowing the wind turbine 30 to operate under wind power, and controlling rotation of the turbine rotor by, for example, restricting either one or a combination of RPM and blade pitch and, indirectly, power and torque through the turbine controller.

Any suitable test regimes known in the art may be used. In one embodiment of the invention, the constant torque run-ups described above with reference to FIG. 2 are used. The testing may focus on one more particular operational areas of the wind turbine drivetrain. For example, if it has previously been determined that tonal noise occurs in a particular operational area (so-called 'critical areas'), or that high levels of drivetrain vibration occur in a particular operational area.

In some embodiments of the invention, vibration, noise and optionally operating parameter data are acquired under both normal operating conditions and under test regimes. In this case, data obtained during normal operating conditions may be used to identify critical areas of operation where tonal noise has been observed or is suspected. The testing regimes may then cover, or cover in particular detail, the identified areas of operation in order to characterize the critical areas of operation in detail. Exemplary methods of identifying critical areas of noise data in which there is tonal noise are described below with reference to FIG. 5.

Figure 4:
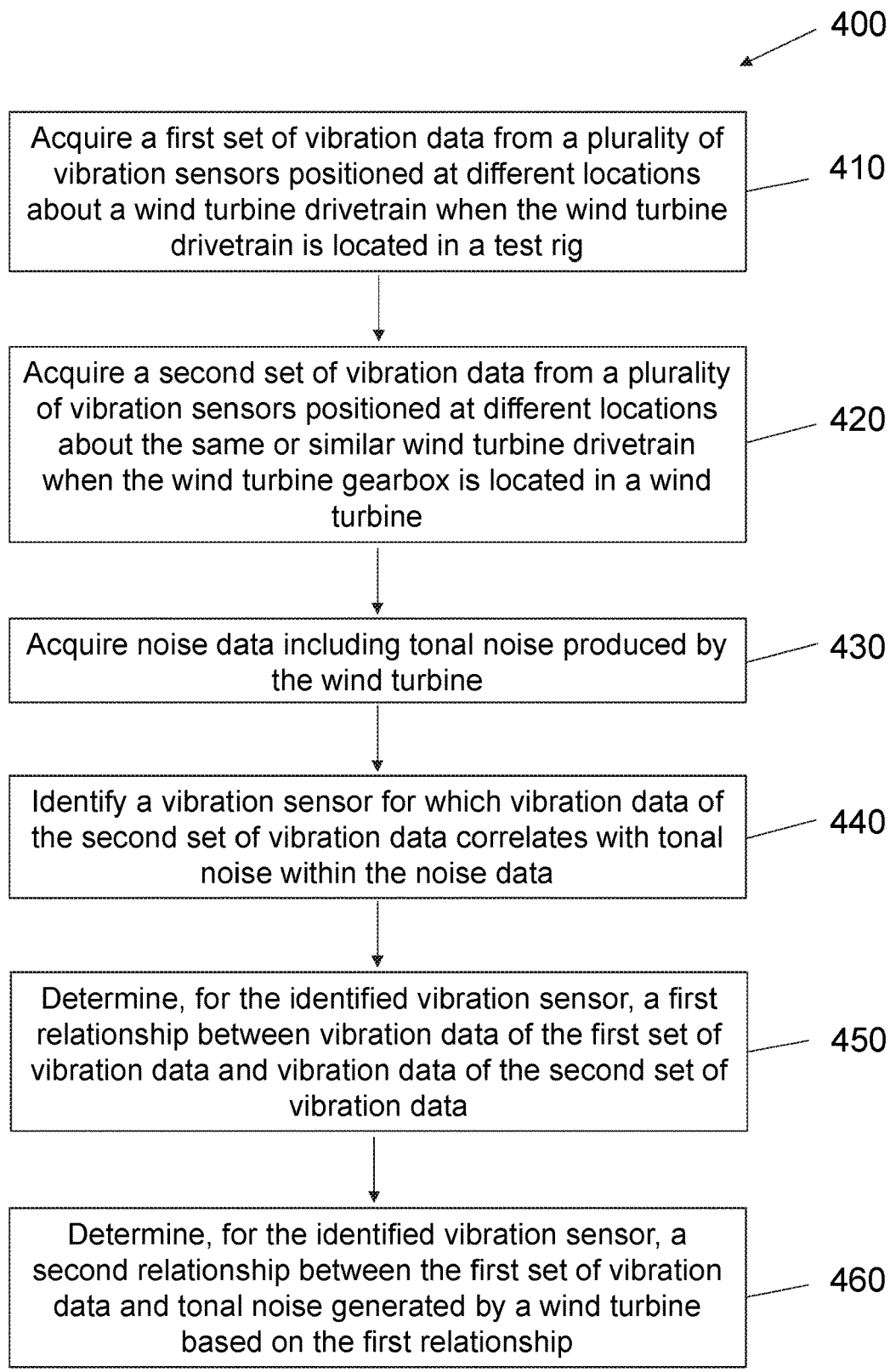
FIG. 4 is a flow diagram illustrating a method of predicting tonal noise produced by a wind turbine, in accordance with one aspect of the present invention.

FIG. 4 is a flow diagram illustrating a method 400 of predicting tonal produced by a wind turbine according to one aspect of the present invention.

In step 410, a first set of vibration data is acquired. The first set of vibration data is from a plurality of vibration sensors positioned at various different locations about a wind turbine drivetrain when the wind turbine drivetrain is located in a test rig. The first set of vibration data is acquired as described above with reference to FIG. 2 for wind turbine drivetrain 330 located in test rig 20.

Optionally, step 410 further includes acquiring noise data from one or more microphones located in the vicinity of the test rig, as described above with reference to FIG. 2.

In step 420, a second set of vibration data is acquired. The second set of vibration data is from a plurality of vibration sensors positioned at various different locations about the same or a similar wind turbine drivetrain when the wind turbine drivetrain is located in a wind turbine. The second set of vibration data is acquired as described above with reference to FIG. 3 for the wind turbine drivetrain in wind turbine 30, and may be acquired during normal operation of the wind turbine, during testing of the wind turbine, or both.

The wind turbine drivetrain for which the second set of vibration data is acquired is ideally the same wind turbine drivetrain for which the first set of vibration data is acquired. However, drivetrains that are similar, such as drivetrains of the same type and specification, can be used. Optionally, at least some of the vibration sensors are positioned at locations corresponding to the locations of the vibration sensors positioned at different locations about the drivetrain when it is located in the test rig, as described above with reference to FIGS. 2 and 3.

In step 430, noise data including tonal noise produced by the wind turbine is acquired. The noise data is acquired via one or more microphones positioned to capture noise produced by the wind turbine, as described above with reference to FIG. 3. The noise data can be obtained during normal operation of the wind turbine, during testing of the wind turbine, or both, as described above with reference to FIG. 3. Optionally, the noise data includes noise data captured by one or more microphones within or within the vicinity of the nacelle of the wind turbine, as described above with reference to FIG. 3.

In step 440, a vibration sensor of interest is determined using vibration data of the second set of vibration data and the noise data. A vibration sensor of interest is a sensor for which the output corresponds or relates to turbine noise output, and particularly tonal noise, in a predictable way for at least a range of turbine operating parameters (e.g. a particular RPM range). This allows the output of the vibration sensor to be used as indicative of tonal noise output of the turbine. In particular, a vibration sensor for which vibration data of the second set of vibration data correlates with tonal noise within the noise data is identified. Identifying such a sensor involves comparing the noise data and vibration data, and in particular comparing the data in a region of the data where the noise data includes, or is a candidate for including, tonal noise. Comparing the noise data and vibration data may involve standard data correlation techniques, such as determining a correlation coefficient or value. For example, a correlation value representative of the strength of the correlation between the noise data and vibration level data may be calculated, and the vibration sensor with the greatest correlation value, or vibration sensors with a correlation value exceeding a predetermined value, may be identified.

In some cases, where multiple data regions including tonal noise are identified, one or more vibration sensors may be identified for each of the identified regions. For example, the vibration data from one or more vibration sensors may correlate well with the noise data for a first set of operating parameters, such as a first RPM range, and the vibration data from one or more different vibration sensors may correlate well with the noise for a second set of operating parameters, such as a second RPM range. In this case, different identified vibration sensors may correspond to different load cases—that is, where the wind turbine is operating according to different sets of operating parameters.

Various ways in which tonal noise can be identified from noise data will be apparent to those skilled in the art. In one embodiment, tonal noise is identified by identifying a deviation in the noise data. Other exemplary methods of identifying regions of the noise data where there is tonal noise will be described in more detail below with reference to FIG. 5.

In step 450, a first relationship between vibration data of the first set of vibration data and vibration data of the second set of vibration data is determined for the identified vibration sensor.

Determining the first relationship involves comparing vibration data of the identified sensor with vibration data of the first set of vibration data, and using techniques known in the art to determine a mapping or transfer function between the vibration data of the identified sensor and vibration data of the first set of vibration data. The mapping or transfer function effectively translates the vibration levels of the drivetrain in the test right to vibration levels of the drivetrain in the wind turbine. Determining the relationship may involve identifying the shapes of the modes, or deflection shapes, as is known in the art, and applying modal assurance criteria, in order to identify corresponding modes in the first and second sets of vibration data.

When establishing the transfer function between test-rig and turbine, correlation may be established, if needed, by selecting sensors and operational area between the two set-ups. In case the correlation is found to be poor corrective steps can be taken to improve the situation. As mentioned above, this may include identifying the mode shapes or deflection shapes responsible for tonality using methods like modal assurance criteria. The mapping or transfer function takes into account how the vibrations from one set-up will be transferred to the other set-up, by limiting the rpm (or power, etc.) range or by shifting the correlation points to account for the difference in frequencies between the set-ups. The transfer function translates the vibration level on a sensor from test-rig to the corresponding vibration level on the turbine for the same or similar operational conditions.

As described above with reference to FIGS. 2 and 3, in some embodiments there is a correspondence between the locations of vibration sensors used in the test rig and the vibration sensors used in the wind turbine. In this case, determining the first relationship may involve comparing vibration data of the identified sensor with vibration data of a corresponding vibration sensor associated with the first set of vibration data and determining a mapping or transfer function between the vibration data associated with the two vibration sensors.

Where a plurality of vibration sensors are identified in step 440, determining the first relationship can include determining relationships for a plurality of vibration sensors. For example, one relationship per identified vibration sensor may be determined. Additionally or alternatively, a determined relationship may map the vibration data of multiple identified sensors to vibration data of one vibration sensor associated with the first set of vibration data, or vice versa. For example, the relationship between an identified vibration sensor and vibration data of the first set of vibration data may include a weighted sum of the contributions of multiple vibration sensors positioned at different locations about the drivetrain when the drivetrain is located in the test rig. In this case, the weightings in the weighted sum may be based on the strength of the correlations between the second set of vibration data and tonal noise within the noise data.

Finally, in step 460, a second relationship between vibration data of the first set of vibration data and tonal noise produced by a wind turbine is determined based on the first relationship determined for the identified vibration sensor.

Determining the second relationship may involve comparing the noise data acquired in step 430 and the vibration data of the one or more vibration sensors identified in step 440 and using techniques known in the art to determine a mapping or transfer function between the noise data and vibration data. This mapping or transfer function can be used in combination with the first relationship determined in step 450 to determine the second relationship between vibration data of the first set of vibration data and tonal noise produced by a wind turbine.

Where a plurality of relationships were determined in step 450, a plurality of relationships can be determined in step 460. Alternatively or additionally, the second relationship may include a weighted sum of contributions of different vibration sensors for which relationships were determined in step 450. In this case, the weightings used in the weighted sum may be based on the strength of the correlations between the second set of vibration data and tonal noise within the noise data. Vibration data of the first set of vibration data can be used to predict tonal noise produced by a wind turbine, and so any appropriate set of relationships that maps vibration data of the first set of vibration data to tonal noise included in the noise data acquired in step 430 can be determined.

The determined second relationship allows vibration data acquired during the testing of a drivetrain in a test rig to be used to predict audible tonal noise that will be produced when the drivetrain is deployed in a wind turbine.

Optionally, the method 400 further includes determining one or more vibration level thresholds for vibration sensors of the plurality of vibration sensors for which the first set of vibration data is acquired. Determining a threshold may involve using a predetermined noise threshold and the determined second relationship. For example, if it is intended to deploy a wind turbine drivetrain to a wind power plant for which there is a known tonal noise limit, this known limit can be used to set a vibration threshold for a drivetrain being tested in the test rig. The threshold could also be in the form of a value obtained by taking the tonal noise result from weighted levels from all the identified sensor channels. For example, the threshold level may be determined from the vibration levels detected by the identified sensors when the tonal noise calculation exceeds a predetermined noise level threshold.

Optionally, the method 400 further includes acquiring a third set of vibration data from a plurality of vibration sensors positioned at different locations about a second wind turbine drivetrain when the second wind turbine drivetrain is undergoing testing in a test rig. The determined second relationship can then be used to predict tonal noise produced by the second wind turbine drivetrain when it is located in a wind turbine, to predict wind turbine operating parameters for which tonal noise will be produced, or to determine whether one or more vibration level thresholds described above are exceeded.

Optionally, where the noise data comprises data captured by one or more microphones positioned about the nacelle of the wind turbine, and where noise data has been acquired from one or more microphones configured to capture noise produced by the test rig when the drivetrain is undergoing testing in the test rig, the method 400 may further comprise determining a relationship between such noise data. This may allow improved prediction of airborne tonality from test rig data.

Figure 5:
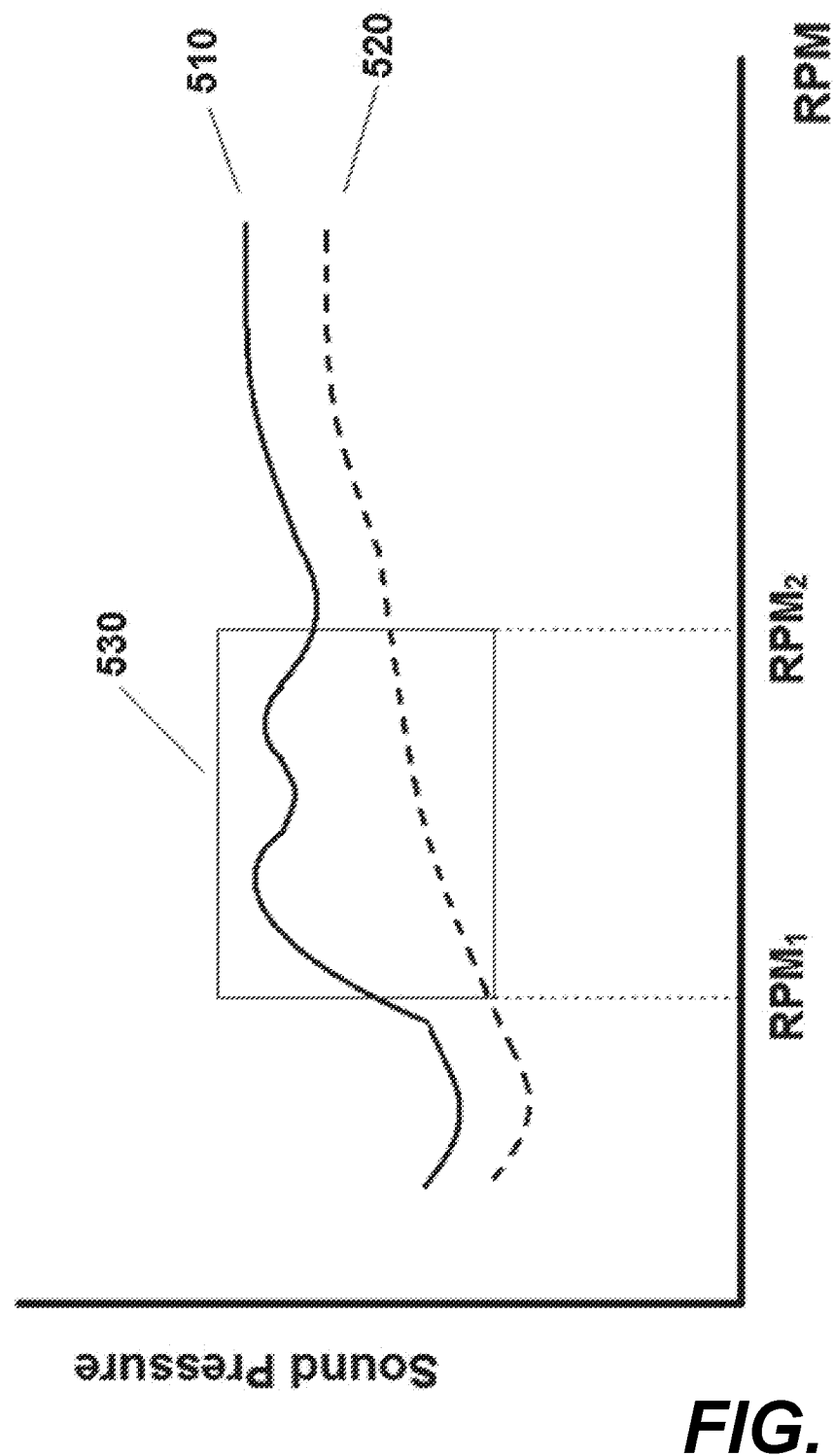
FIG. 5 illustrates exemplary noise data and a method of identifying a region of interest in the noise data.

FIG. 5 shows exemplary noise data and illustrates a method of identifying a region of the noise data that includes tonal noise. Other suitable methods may be used for this function as appropriate.

As can be seen from FIG. 5, the measured sound pressure, which represents noise, is plotted on the vertical axis and the RPM of the turbine is plotted on the horizontal axis. Two curves are shown: a solid curve 510 representing the maximum measured sound pressure as a function of RPM, and a dashed curve 520 representing the minimum measured sound pressure a function of RPM. Such a dataset can be created by combining various time-synchronized sound pressure and RPM data obtained over different periods of time, as will be appreciated by persons skilled in the art.

In general, the deviation between the maximum measured sound pressure 510 and the minimum measured sound pressure 520 is relatively small. However, within an area indicated by the box 530, between RPM values $RPM_1$ and $RPM_2$, there is a greater deviation between the maximum and minimum measured sound pressures. Such a deviation may indicate that the wind turbine was producing tonal noise when the RPM of the wind turbine was between $RPM_1$ and $RPM_2$. The RPM range between $RPM_1$ and $RPM_2$ may then be identified as a region of interest in the noise data.

Determining the values of $RPM_1$ and $RPM_2$ may involve determining RPM values at which the deviation between the maximum and minimum measured noise (sound pressure) exceeds a predetermined threshold. Alternatively, $RPM_1$ and $RPM_2$ may be RPM values between which the average variation between the maximum and minimum measured noise exceeds predetermined threshold. As another example, noise data may be analysed to determine RPM intervals in the data in which tonality is most pronounced, for example in accordance with the IEC 61400-11 standard. Other ways of determining values will be apparent to one skilled in the art.

While the method of identifying the region of interest in the noise data has been described with respect to RPM data, other wind turbine operating parameters could be used. For example, a dataset representing noise level as a function of blade pitch angle, yaw angle, wind speed, torque or any other operating parameter could be used.

Alternatively, a region of the noise data that includes tonal noise could be identified without using any wind turbine operating parameter data. For example, a sharp increase in the noise data, or just a very high noise level at a particular frequency, may indicate that the wind turbine began to emit to tonal noise at the time corresponding to the sharp increase or the very high noise level.

Generally the turbine noise data captured or acquired from the test rig, or from the wind turbine, has been described above as being detected using one or more microphones. However, for the avoidance of doubt, noise data can be obtained using other methods and from other sources, and so one or more microphones associated with the test rig or wind turbine are not a requirement. For example, the noise data can be calculated using one or more noise emission models. The noise emission models may, for example, be wind turbine or wind turbine component (such as the drivetrain) noise emission models, a number of which are well known in the art. The models may take one or more turbine component, turbine or wind farm parameters as inputs and provide, as an output, noise data indicating the volume and frequencies of emitted noise at various distances from the wind turbine or wind turbine component. The inputs may be one or more operating parameters from turbine operational data. The noise emission models may be applied to live recorded data or recorded data.

As a result of predicting the tonal noise produced by a wind turbine, according to any of the methods described herein, it is possible to control a wind turbine during operation based upon one or more detected vibration levels and the determined relationship between the vibration levels and tonal noise. As an example, the turbine control system may be controlled to add masking noise to the noise output of the wind turbine based upon detected vibration levels. The masking noise masks tonal noise by adding additional noise that masks or covers the more annoying tonal noise. The masking noise may be added by controlling any appropriate turbine operating parameter. This may include controlling noise emitted by one or more turbine cooling fans, such as by varying the speed of one or more cooling fans. This may also, or alternatively, include a speaker or other noise output device being used to output predetermined masking noise, which may be based upon analysis of turbine tonal noise output. Additionally, or alternatively, one or more turbine operating parameters such as rotor speed or power generation may be controlled to adjust noise output to reduce tonality by decreasing tonal noise or increasing masking noise.

Described above are a number of embodiments with various optional features. It should be appreciated that, with the exception of any mutually exclusive features, any combination of one or more optional features are possible.

The invention claimed is:

1. A method of predicting tonal noise produced by a wind turbine, the method comprising:
   acquiring a first set of vibration data, the first set of vibration data being from a plurality of vibration sensors positioned at locations about a wind turbine drivetrain when the wind turbine drivetrain is undergoing testing in a test rig;
   acquiring a second set of vibration data, the second set of vibration data being from a plurality of vibration sensors positioned at locations about the same or a similar wind turbine drivetrain when located in a wind turbine;
   acquiring noise data including tonal noise produced by the wind turbine;
   identifying a vibration sensor of interest using vibration data of the second set of vibration data and the noise data;
   determining, for the identified vibration sensor, a first relationship between vibration data of the first set of vibration data and vibration data of the second set of vibration data; and
   determining, for the identified vibration sensor, a second relationship between the first set of vibration data and tonal noise produced by a wind turbine based on the first relationship.

2. The method of claim 1 further comprising determining a threshold level based on the second relationship and a predetermined noise level.

3. The method of claim 1 further comprising:
   acquiring a third set of vibration data, the third set of vibration data being data from a plurality of vibration sensors positioned at locations about a second wind turbine drivetrain when the second wind turbine drivetrain is undergoing testing in a test rig; and
   determining whether vibration data of the third set of vibration data reaches a predetermined criteria, such as exceeding a threshold level.

4. The method of claim 1 further comprising:
   acquiring a third set of vibration data, the third set of vibration data being data from a plurality of vibration sensors positioned at locations about a second wind turbine drivetrain when the second wind turbine drivetrain is undergoing testing in a test rig; and
   predicting a tonal noise level produced by a wind turbine using the third set of vibration data and the second relationship.

5. The method of claim 1 further comprising:
   acquiring a third set of vibration data, the third set of vibration data being data from a plurality of vibration sensors positioned at locations about a second wind turbine drivetrain when the second wind turbine drivetrain is undergoing testing in a test rig; and
   predicting one or more wind turbine operating parameters for which a wind turbine will produce tonal noise using the third set of vibration data and the second relationship.

6. The method of claim 1 further comprising:
   acquiring a set of operating parameter data representing operating parameters of the test rig when the wind turbine drivetrain is undergoing testing in the test rig.

7. The method of claim 6 wherein the operating parameter data representing operating parameters of the test rig comprise one or more of RPM, torque and power.

8. The method of claim 1 wherein the first set of vibration data comprises vibration data captured during one or more constant torque run-ups.

9. The method of claim 1 further comprising:
   acquiring noise data from one or more microphones configured to capture noise produced by the test rig when the wind turbine drivetrain is undergoing testing in the test rig, or acquiring noise data using one or more noise emission models.

10. The method of claim 1 wherein the noise data including tonal noise produced by the wind turbine comprises noise data acquired by one or more microphones positioned about the wind turbine nacelle or by using one or more noise emission models.

11. The method of claim 1 further comprising:
    acquiring a set of operating parameter data representing operating parameters of the wind turbine.

12. The method of claim 11 wherein the operating parameter data representing operating parameters of the wind turbine comprise one or more of RPM, torque, power, blade pitch angle, yaw angle, wind speed and wind direction.

13. The method of claim 1 wherein the noise data includes tonal noise produced by the wind turbine and the second set of vibration data comprises data captured during one or more constant torque run-ups.

14. The method of claim 1 wherein the noise data includes tonal noise produced by the wind turbine and the second set of vibration data comprises data captured during normal operation of the wind turbine.

15. The method of claim 1 wherein at least one of the plurality of vibration sensors associated with the second set of vibration data are associated with a Condition Monitoring System (CMS) associated with the wind turbine.

16. The method of claim 1 further comprising identifying a region of interest in the noise data, the region of interest being a candidate for containing tonal noise produced by the wind turbine, and wherein identifying the vibration sensor comprises identifying a vibration sensor based on the noise data in the region of interest.

17. The method of claim 16 wherein identifying the region of interest comprises determining a variation of detected noise levels in the noise data indicative of tonal noise.

18. The method of claim 16 further comprising determining a set of wind turbine operating parameters corresponding to the region of interest.

19. The method of claim 18 wherein:
determining, for the identified vibration sensor, the first relationship between vibration data of the first set of vibration data and vibration data of the second set of vibration data comprises determining the first relationship for the wind turbine operating parameters corresponding to the region of interest.

20. The method of claim 1 wherein:
determining, for the identified vibration sensor, a second relationship between the first set of vibration data and tonal noise produced by a wind turbine based on the first relationship further comprises determining a relationship between vibration data of the second set of vibration data and the noise data.

21. The method of claim 1 wherein the noise data comprises noise data captured during normal operation of the wind turbine and noise data captured during testing of the wind turbine, the method further comprising determining a relationship between noise data captured during normal operation and noise data captured during testing.

22. The method of claim 1 further comprising:
identifying one or more additional vibration sensors of interest using vibration data of the second set of vibration data and the noise data.

23. The method of claim 22 wherein the first relationship includes a weighted sum of vibration data of the identified vibration sensor and vibration data of the one or more additional identified vibration sensors.

24. The method of claim 22 wherein:
determining, for the identified vibration sensor, a second relationship between the first set of vibration data and tonal noise produced by a wind turbine based on the first relationship further comprises determining a relationship between vibration data of the second set of vibration data and the noise data, the relationship including a weighted sum of vibration data of the identified vibration sensor and vibration data of the one or more additional identified vibration sensors.

25. The method of claim 23 wherein weightings used in the weighted sum are based on strengths of correlations between the first set of vibration data and tonal noise produced by a wind turbine for identified sensors.

26. The method of claim 22 further comprising:
determining, for each of the respective one or more additional vibration sensors, a respective first relationship between vibration data of the first set of vibration data and vibration data of the second set of vibration data; and
determining, for each of the respective one or more additional vibration sensors, a respective second relationship between the first set of vibration data and tonal noise produced by a wind turbine based on the respective first relationship.

27. The method of claim 26 further comprising:
determining, for each of the respective one or more additional vibration sensors, a predetermined criteria, such as a threshold vibration level, based on the respective second relationship and a predetermined noise level.

28. The method of claim 22 wherein vibration data of the identified vibration sensors correlate with the noise data for different wind turbine operating parameters.

29. The method of claim 1 wherein the location of at least one of the plurality of vibration sensors associated with the first set of vibration data corresponds to the location of at least one of the plurality of vibration sensors associated with the second set of vibration data.

30. The method of claim 1 wherein the noise data including tonal noise produced by the wind turbine comprises noise data acquired by one or more microphones positioned about the wind turbine nacelle, or using one or more turbine noise emission models, and further comprising:
acquiring noise data from one or more microphones configured to capture noise produced by the test rig when the wind turbine drivetrain is undergoing testing in the test rig, or acquiring noise data using one or more drivetrain noise emission models; and
determining a relationship between noise data from one or more microphones or emission models configured to capture noise produced by the test rig when the wind turbine drivetrain is undergoing testing in the test rig and noise data acquired by one or more microphones positioned about, or one or more noise emission models configured to calculate noise emitted from, the wind turbine nacelle.

31. The method of claim 2, further comprising:
testing the wind turbine drivetrain by:
acquiring a third set of vibration data, the third set of vibration data being data from a plurality of vibration sensors positioned at locations about the wind turbine drivetrain when the wind turbine drivetrain is undergoing testing in a test rig; and
determining whether vibration data of the third set of vibration data exceeds the threshold level.

32. The method of claim 1, further comprising:
testing the wind turbine drivetrain by:
acquiring a third set of vibration data, the third set of vibration data being data from plurality of vibration sensors positioned at locations about the wind turbine drivetrain when the wind turbine drivetrain is undergoing testing in a test rig; and
predicting a tonal noise level produced by a wind turbine using the third set of vibration data and the second relationship.

33. The method of claim 1, further comprising:
testing the wind turbine drivetrain by:
acquiring a third set of vibration data, the third set of vibration data being data from a plurality of vibration sensors positioned at locations about the wind turbine drivetrain when the wind turbine drivetrain is undergoing testing in a test rig; and
predicting one or more wind turbine operating parameters for which a wind turbine will produce tonal noise using the third set of vibration data and the second relationship.

34. The method of claim 31, further comprising selecting one or more drivetrains according to the results of the method.

35. The method of claim 1, wherein the wind turbine drivetrain comprises a gearbox and a generator.

36. A computer system comprising one or more computers configured to the implement a method, the method comprising:
- acquiring a first set of vibration data, the first set of vibration data being from a plurality of vibration sensors positioned at locations about a wind turbine drivetrain when the wind turbine drivetrain is undergoing testing in a test rig;
- acquiring a second set of vibration data, the second set of vibration data being from a plurality of vibration sensors positioned at locations about the same or a similar wind turbine drivetrain when located in a wind turbine;
- acquiring noise data including tonal noise produced by the wind turbine;
- identifying a vibration sensor of interest using vibration data of the second set of vibration data and the noise data;
- determining, for the identified vibration sensor, a first relationship between vibration data of the first set of vibration data and vibration data of the second set of vibration data; and
- determining, for the identified vibration sensor, a second relationship between the first set of vibration data and tonal noise produced by a wind turbine based on the first relationship.

37. A computer program which when executed on a computing device causes it to carry out a method, the method comprising:
- acquiring a first set of vibration data, the first set of vibration data being from a plurality of vibration sensors positioned at locations about a wind turbine drivetrain when the wind turbine drivetrain is undergoing testing in a test rig;
- acquiring a second set of vibration data, the second set of vibration data being from a plurality of vibration sensors positioned at locations about the same or a similar wind turbine drivetrain when located in a wind turbine;
- acquiring noise data including tonal noise produced by the wind turbine;
- identifying a vibration sensor of interest using vibration data of the second set of vibration data and the noise data;
- determining, for the identified vibration sensor, a first relationship between vibration data of the first set of vibration data and vibration data of the second set of vibration data; and
- determining, for the identified vibration sensor, a second relationship between the first set of vibration data and tonal noise produced by a wind turbine based on the first relationship.

* * * * *